June 27, 1939.  B. E. DUBBS  2,164,233

SELF-CLEARING RAKE

Filed Sept. 2, 1937

Inventor

Benton E. Dubbs

By L. B. James

Attorney

Patented June 27, 1939

2,164,233

UNITED STATES PATENT OFFICE 2,164,233

SELF-CLEARING RAKE

Benton E. Dubbs, Kokomo, Ind.

Application September 2, 1937, Serial No. 162,192

2 Claims. (Cl. 55—10)

This invention relates to agricultural implements and more particularly hand rakes.

The primary object of this invention resides in the provision of a self-clearing hand rake.

Another object of this invention resides in the provision of a self-clearing hand rake consisting of a particular assemblage of elements adapted to cooperate to permit it to be operated in the usual manner.

A further object of this invention resides in the particular manner of mounting the rake head on the handle.

With these and other objects in view this invention resides in certain novel features of construction and arrangement of elements to be hereinafter more particularly set forth in the specification, illustrated in the accompanying drawing and pointed out in the appended claims and, while this disclosure depicts my present conception of the invention, the right is reserved to resort to such changes in construction and arrangement of elements as come within the scope of the claims.

In the accompanying drawing forming a part of this application.

Figure 1:
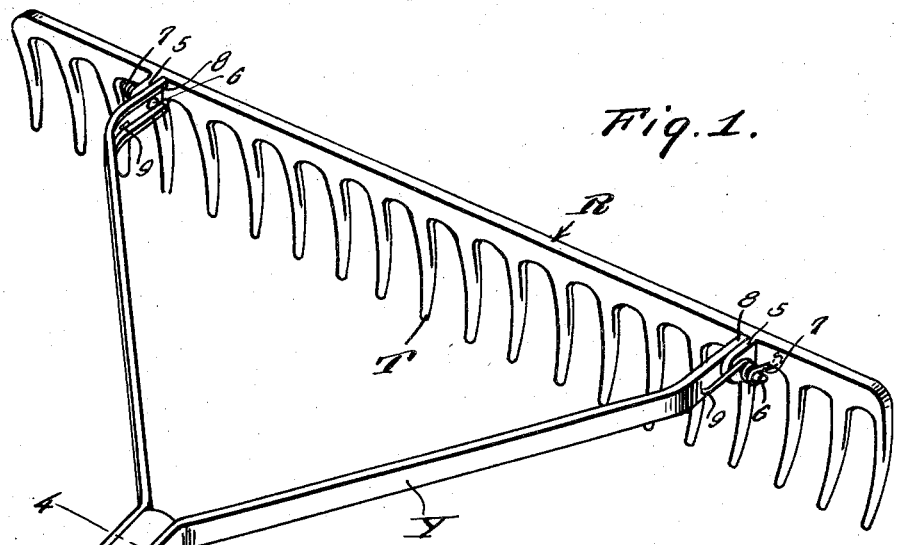
Fig. 1 is a perspective view of a hand rake as constructed in accordance with this invention.
Figure 2:
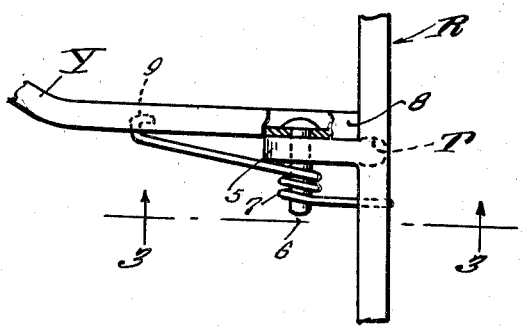
Fig. 2 is an enlarged plan view of a portion of the rake partly in section.
Figure 4:
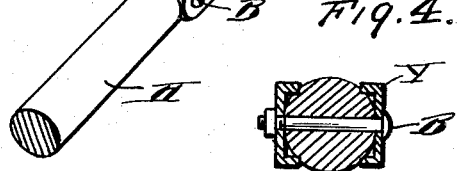
Fig. 4 is a detail sectional view approximately on line 4—4 of Fig. 1.
Figure 3:
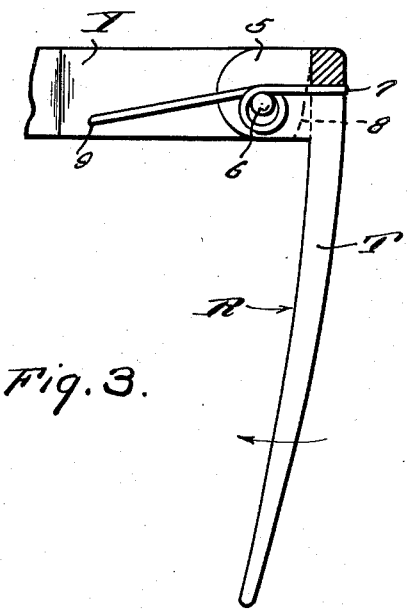
Fig. 3 is an enlarged detail sectional view approximately on line 3—3 of Fig. 2.

In the present embodiment of this invention the letter R designates, in general, a hand rake which consists of a handle H, a head T pivotally connected to the handle by a substantially channel-shaped yoke Y preferably secured to the handle by bolts B.

Formed on the head T are spaced apertured ears or lugs 5 adapted to be pivotally secured to the free ends, indicated at 8, of the yoke Y by suitable studs 6 rigidly formed on the yoke adjacent the outer extremities thereof and, in order to present the head T from swinging in but one direction, the studs 6 are disposed off center of the extremities of the yoke so as to permit the rake head to abut the ends of the yoke when drawn over the ground toward the operator and swing under the yoke when pushed forwardly, thus it is apparent the rake can be operated in the usual manner to collect grass, hay, etc., and, when clogged, can be cleared by simply pushing it forwardly over the ground.

In order to maintain the rake head and yoke in raking relation and to return the same to normal position when operated to clear the same, springs 7 are coiled around the studs 6 with their outer extremities slidably bearing against the rake head between certain of the tines thereof and their inner extremities extended through apertures 9 in the yoke and bent to prevent disengagement therefrom.

With this invention fully set forth it is manifest that a self-clearing rake of simple construction is provided and, through the particular arrangement of elements positive operation is assured.

Having thus described my invention what I claim and desire to protect by Letters Patent is:

1. A self-clearing rake of the character set forth comprising a handle, a yoke having diverging arms of channel-shape configuration in cross section, said arms having their flanges disposed in opposed relation to one another and partially surrounding the lower end of the handle, a rake head, apertured ears formed on the rake head, oppositely extending studs rigidly formed on the yoke arms adjacent their outer ends, said studs pivotally engaging the ears with their outer free extremities terminating beyond the ears, and coil springs seated on the free ends of the studs with their inner ends secured to the yoke and their outer ends loosely seated between certain tines of the rake head.

2. A clearing rake comprising a handle, a yoke with diverging arms extending from the lower end of the handle, studs extending outwardly from the lower ends of such arms, a rake head, ears formed on the rake head and receiving said studs, and coil springs surrounding the outer ends of the studs and having their inner ends engaging the yoke arms and their outer ends engaging beneath the body of the rake head.

BENTON E. DUBBS.